Figure 1:
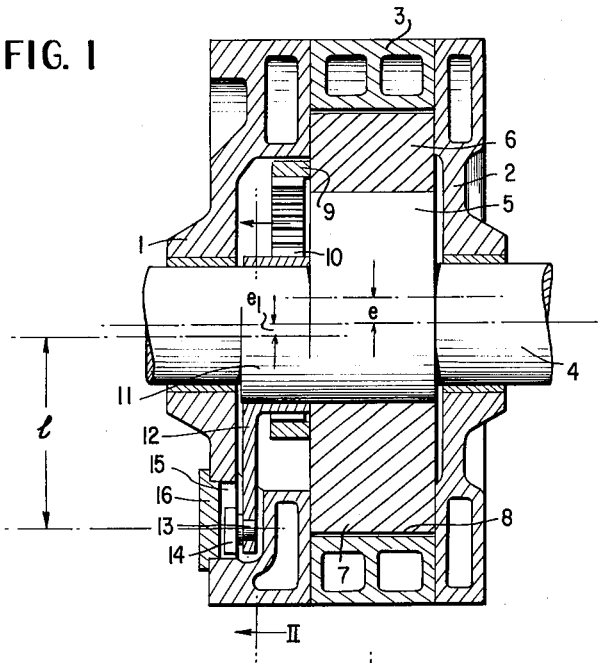

March 24, 1964 W. HÖSCHELE 3,125,996
ROTARY PISTON ENGINE
Filed June 12, 1962 3 Sheets-Sheet 1

INVENTOR.
WOLFGANG HÖSCHELE
BY *Dicke + Craig*
ATTORNEYS

March 24, 1964  W. HÖSCHELE  3,125,996
ROTARY PISTON ENGINE
Filed June 12, 1962  3 Sheets-Sheet 2

INVENTOR.
WOLFGANG HÖSCHELE
BY *Dicke & Craig*
ATTORNEYS.

March 24, 1964  W. HÖSCHELE  3,125,996
ROTARY PISTON ENGINE

Filed June 12, 1962  3 Sheets-Sheet 3

INVENTOR.
WOLFGANG HÖSCHELE

BY *Dicke + Craig*

ATTORNEYS.

United States Patent Office 3,125,996
Patented Mar. 24, 1964

3,125,996
ROTARY PISTON ENGINE
Wolfgang Höschele, Gerlingen, Kreis Leonberg, Germany, assignor to Daimler-Benz Aktiengesellschaft, Stuttgart-Unterturkheim, Germany
Filed June 12, 1962, Ser. No. 202,017
Claims priority, application Germany June 15, 1961
18 Claims. (Cl. 123—8)

The present invention relates to a rotary piston internal combustion engine in which a triangularly-shaped piston is eccentrically supported on a driven or output shaft within a housing having an internal boundary provided with two zones closely approaching the axis of rotation, and in which the piston slides with the corners thereof along the internal boundary during the movements of the piston controlled by a transmission having an internally toothed gear rigid and concentric at the piston and an externally-toothed gear meshing with the internally toothed gear relative to the housing and thereby controls or valves the gas exchange channels of the engine.

With internal combustion engines of this type, sufficiently large theoretical compression ratios are not attainable with a rational ratio of working space to structural dimensions or size which would permit to arrange nearly the entire compression volume in a combustion chamber provided within the piston in order to create thereby the structural prerequisites for a favorable applicability of the diesel operation.

It has now been discovered that favorable combustion spaces may be formed while maintaining the useful working volume and the structural dimensions or a smaller structural dimension may be realized while maintaining the useful working volume and elongated combustion spaces by providing transmission means in accordance with the present invention which impart to the externally-toothed gear meshing with the internally toothed gear a to and fro swinging movement about the axis thereof. There is forced, by the to and fro swinging movements of the externally toothed gear, upon the piston through the internally toothed gear an asymmetrical rotation of its own by means of which one attains such a configuration of the internal boundary that within the area of the zone approaching the axis, in which the piston is disposed in the compression position thereof, in contrast to the oppositely disposed zone approaching the axis, no constriction is present, and in which the piston contour within the area between two corners thereof corresponds approximately to the contour of the zone in proximity to the axis of the internal boundary devoid of such constriction.

According to a further feature and development of the present inventive concept, the externally-toothed gear may be supported on an eccentric of the driven shaft which is directed oppositely with respect to the eccentric on which the piston is supported. By reason of such an arrangement, the to and fro swinging movements of the externally toothed gear may be produced by the driven shaft whereby the guidance of the gear, according to still a further feature of the present invention, may be taken over by a lever rigidly connected with the externally toothed gear which lever is movably supported with the free end thereof at the housing.

The free end of the lever may be provided with a sliding member which may slide in a rectilinear guide means fixed at the housing and disposed radially to the driven shaft. However, the free end of the lever may also be pivotally secured to a rod or linkage which is pivotally supported at the housing while being located substantially perpendicularly to the longitudinal axis of the lever.

According to another embodiment of the present invention, the externally toothed gear may also be supported coaxially to the driven shaft on the latter or at the housing and the to and fro swinging movement may be produced by means of a crank drive engaging the gear.

Accordingly, it is an object of the present invention to provide a rotary piston internal combustion engine of the type described hereinabove which obviates the shortcomings and inadequacies encountered in the prior art constructions, especially insofar as applicability of diesel operation to such type of engine is concerned.

It is another object of the present invention to provide a rotary piston, internal combustion engine in which a sufficiently large theoretical compression condition may be achieved with a rational ratio of working space to structural dimensions of the engine.

Still another object of the present invention resides in the provision of a rotary piston internal combustion engine of the type described hereinabove in which substantially the entire compression volume of a combustion chamber may be accommodated within the piston to permit production of sufficiently high compression ratios so as to make feasible the application of the diesel operation.

A further object of the present invention resides in the provision of a rotary piston internal combustion engine provided with a polygonal piston rotating within a housing having an internal boundary provided with two zones approaching more closely the axis of rotation, in which one of these zones is so constructed and arranged in its configuration as to be substantially complementary to the external contour of the piston flank disposed between two corners thereof, and in which the movements of the piston are so controlled that the piston will slide along the internal boundary with the corners thereof in such a manner that within the compression position of the piston, the aforementioned flank closely approaches the said one zone so as to achieve high compression ratios within the combustion chamber recesses in the piston.

Still a further object of the preesnt invention resides in the provision of a rotary piston internal combustion engine of the type described hereinabove in which the engine may be operated as a diesel engine while maintaining reasonable dimensions as well as a useful working volume.

Figure 2:
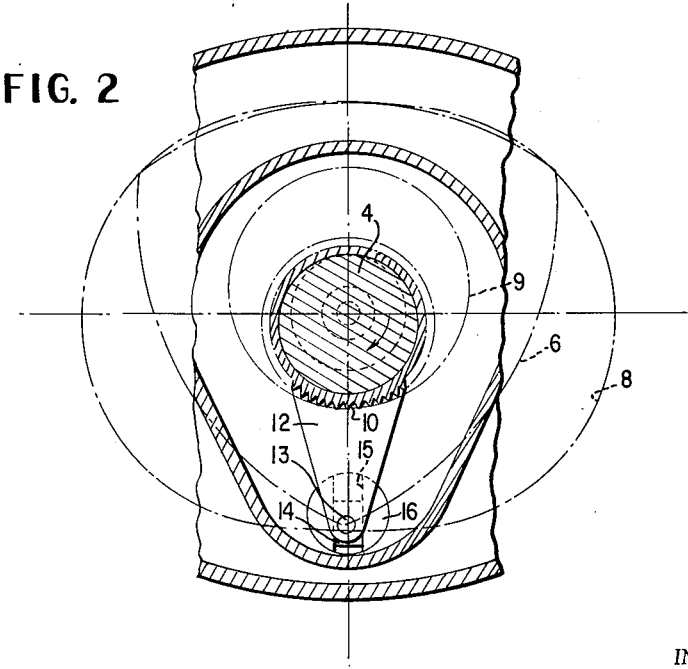
Figure 4:
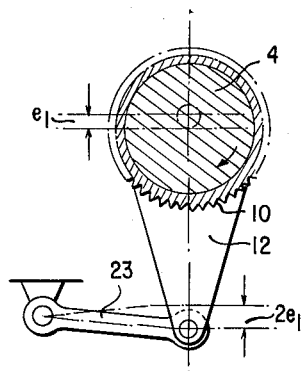
Figure 3:
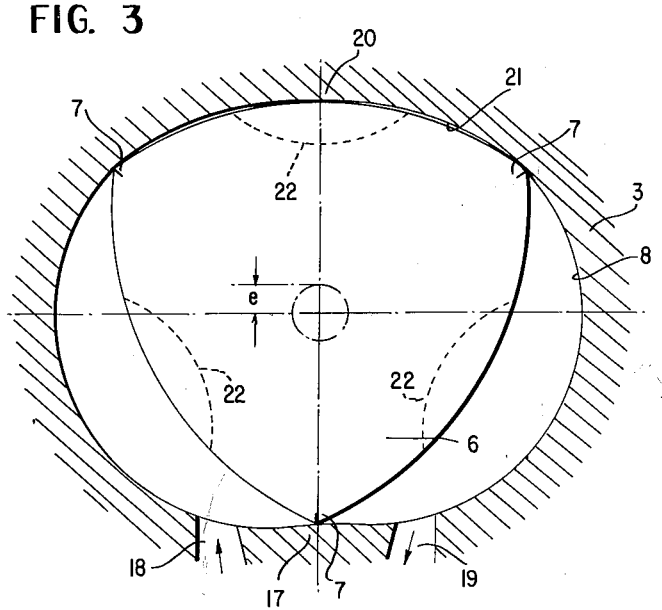
Figure 5:
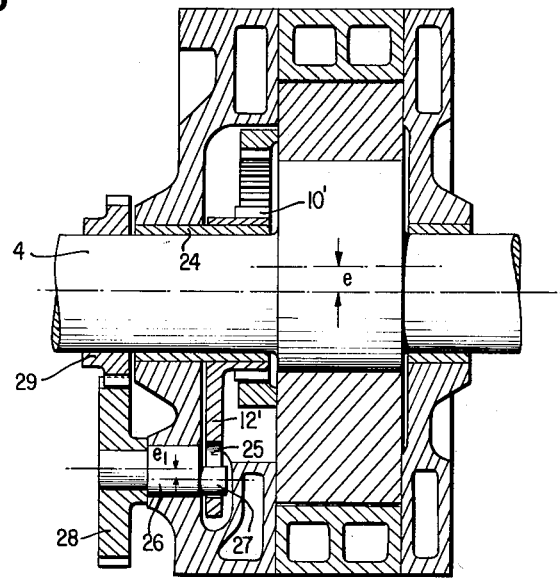
Figure 6:
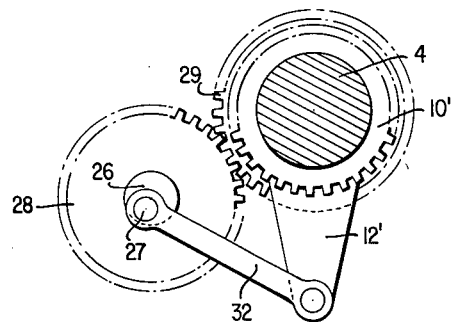

These and other objects, features and advantages of the present invention will become more obvious from the following description when taken in connection with the accompanying drawing which shows, for purposes of illustration only, two embodiments in accordance with the present invention, and wherein FIGURE 1 is a longitudinal cross sectional view through a rotary piston internal combustion engine provided with an externally-toothed eccentrically supported gear in the transmission thereof for controlling the piston;

FIGURE 2 is a partial cross sectional view taken along line II—II of FIGURE 1;

FIGURE 3 is a schematic cross section through the internal combustion engine of FIGURE 1, FIGURE 4 is a partial cross sectional view through a modified embodiment of a control arrangement for the swinging movements of the eccentrically supported externally toothed gear, FIGURE 5 is a partial cross sectional view, similar to FIGURE 1, of a modified embodiment of a rotary piston internal combustion engine provided with an externally-toothed gear concentrically supported on the output shaft, and FIGURE 6 is a partial cross sectional view through a modified embodiment of a control arrangement, similar to FIGURE 4, for the swinging movements of the externally-toothed gear concentrically supported about the output shaft.

Referring now to the drawing wherein like reference numerals are used throughout the various views to designate corresponding parts, and more particularly to FIGURES 1 and 2, reference numerals 1 and 2 designate therein, respectively, the lateral disc-like members of the internal combustion engine housing 3. The driven or output shaft 4 is rotatably supported within the lateral disk-like members 1 and 2 of the engine housing 3. The driven shaft 4 is provided with an eccentric 5 the center longitudinal axis of which has a distance $e$ from the axis of rotation of the driven shaft 4. The piston 6 is supported on the eccentric 5 and slides with the corners 7 thereof along the internal boundary 8 formed within the housing 3. For purposes of controlling the rotational speed of the piston 6 relative to the rotational speed of the driven shaft 4, there is provided a transmission consisting of the internally toothed gear 9 and of the externally toothed gear 10 meshing with the gear 9. The internally toothed gear 9 is fixedly arranged laterally at the piston 6 and coaxially with respect thereto. The externally-toothed gear 10 is supported on the eccentric 11 which is arranged on the driven shaft 4 adjacent the eccentric 5. The center longitudinal axis of the eccentric 11 is spaced from the axis of rotation of the driven shaft 4 by a distance $e_1$. In the illustrated embodiment, the eccentricity of the eccentric 11 is oppositely directed with respect to the eccentricity of the eccentric 5. The ratio of number of teeth of gear 10 to the number of teeth of gear 9 amounts in the illustrated embodiment to ⅔. The lever 12 is rigidly connected with the gear 10 for rotation in unison therewith, whereby the lever 12 is directed oppositely to the eccentric 11. The sliding member 14 is supported at the free end of the lever 12 on a bearing pin 13. The sliding member 14 slides within a rectilinear guide means 15 which is arranged within the separate insert 16 provided in the side wall 1 of the housing 3. The distance of the axis of rotation of the gear 10 from the swinging axis of the pin 13 is designated in drawing by reference character $l$.

As may be readily seen from FIGURE 3, the piston 6 is provided with three corners 7 which are provided in any suitable conventional manner with sealing elements extending parallel to the axis thereof and which slide along the two-arched internal boundary 8 of the housing 3. The inlet channel 18 and the outlet channel 19 are arranged, respectively, to both sides of the zone 17 in the housing which approaches more closely, i.e., is in proximity to the axis of rotation. Whereas the internal boundary 8 is provided with a slight inwardly directed constriction within the zone 17 in proximity to the axis, this is not the case in connection with the oppositely disposed zone 20 in proximity to the axis. When the piston 6 is in the upper dead center position as shown in FIGURE 3, then the piston flank 21 disposed within the area between two corners 7 thereof closely approaches the internal boundary 8 so that relatively high theoretical compression conditions may be achieved and combustion-space recesses 22 which are favorable for the combustion in diesel operation may be arranged within the piston 6.

In order that the three corners 7 of the piston 6, displaced by 120° with respect to each other, but always along the internal boundary 8 of the housing 3, the following law of movement must exist:

$$\omega_k = \frac{\omega_e}{3} + \gamma_0 \cdot \omega_e \cdot f(\alpha_e) \qquad (1)$$

in which $\omega_k$=angular velocity of the piston 6 on the eccentric 5
$\omega_e$=angular velocity of the eccentric 5
$\gamma_0$=is a constant angle chosen at will and measured in radians which determines the magnitude of the compression ratio,
$\alpha_e$=angle of rotation of the eccentric 5
$f(\alpha_e)$=a $2\pi$-periodic function, that is,
$f(\alpha_e) = f(\alpha_e + 2\pi)$ Favorable accelerating conditions are achieved if $$f(\alpha_e) = \sin \alpha_e = \sin \omega_e \cdot t \qquad (2)$$

If the driven shaft 4 and therewith the eccentrics 5 and 11 are rotated with an angular velocity $\omega_e$, then the externally toothed gear 10 by reason of its pivotal connection at the lever 12 and by reasons of the guidance of the lever 12 by means of the sliding member 14 in the rectilinear guide means 15 carries out in first approximation a sinusoidally-shaped swinging movement about its axis and the internally toothed gear 9 carries out together with the piston 6 the angular velocity varying with the $2\pi$-periodicity $$\omega_k = \frac{\omega_e}{3} + \gamma_0 \cdot \omega_e \cdot f(\alpha_e) \qquad (3)$$

whereby in the case of the guide system for the sliding member of FIGURE 1, $$f(\alpha_e) = -\left[\left(1 + \frac{\lambda^2}{8}\right) \sin \alpha_e - \frac{\lambda^2}{24} \sin 3\alpha_e + \ldots \right] \qquad (4)$$

$$\lambda = \frac{e_1}{l} = \tan \frac{3}{2}\gamma_0 \qquad (5)$$

and $\alpha_e = 0$=that eccentric position in which the eccentricity $e$ is disposed perpendicularly to the minor axis of the internal boundary 8.

As $\gamma_0$ increases, the compression conditions also increase, however, there also occur larger accelerating forces within the drive of the piston. The angle $\gamma_0$ can amount up to ten radians.

Functions $f(\alpha_e)$ deviating more pronouncedly from the sinusoidal shape are achieved if according to FIGURE 4, the lever 12 is guided, instead of with a rectilinear guide system, by the rocker arm 23 supported at the housing.

The manufacture of the internal boundary 8 of the housing 3 can appropriately take place by means of a transmission which is constructed in a manner similar to the piston drive and in which metal cutting work tools may be arranged at the piston corners. Since the gears 9 and 10 are loaded by the inertia moments of rotation, they have to be dimensioned correspondingly. However, gas moments of rotation do not occur in the transmission constituted by gears 9 and 10.

The internal combustion engine has a rotating free force due to inertia of the first order which may be completely balanced by counter-weights on the driven shaft 4. A free inertia moment of rotation of substantially the first order which is super-imposed on the free gas moment of rotation of first order may be balanced by the arrangement of two pistons 6 in which the eccentrics 5 are arranged displaced by 180° with an internal boundary 8 that is not displaced or offset.

FIGURE 5 is a partial cross sectional view, similar to FIGURE 1 of a modified embodiment in accordance with the present invention in which the externally-toothed gear is supported concentrically with respect to the driven shaft 4. In this figure, the externally-toothed gear 10' is supported on a bushing 24 concentrically with respect to the driven shaft 4. The lever 12' rigidly secured to the gear 10' as in FIGURE 4 is provided with an elongated aperture 25. A crankarm or eccentric pin member 27 arranged at the shaft 26 engages into the aperture 25. The center longitudinal axis of the crankarm or eccentric pin member 27 is at a distance $e_1$ from the center longitudinal axis of the shaft 26. The distance $e_1$ is directed oppositely to the distance $e$ with respect to the center longitudinal axis of the driven shaft 4. The shaft 26 is suitably supported, for example, in the side wall of the housing and driven in any suitable manner, for example, from the driven shaft 4 by gears 28 and 29 having a gear ratio 1:1.

Instead of providing the connection by means of the elongated apertures 25 and the crankarm or eccentric pin member 27, it is also possible to provide, similar to the showing of FIGURE 4, a lever 32 which engages with the lever 12' and which is supported on the eccentric pin member 27 corresponding to the eccentric pin or crankarm 27 of FIGURE 5.

While I have shown and described two embodiments in accordance with the present invention, it is understood that the same is not limited thereto, but is susceptible of many changes and modifications within the spirit and scope thereof, and I therefore do not wish to be limited to the details shown and described herein, but intend to cover all such changes and modifications as are encompassed by the scope of the appended claims.

I claim:

1. A rotary piston internal combustion engine, comprising housing means provided with gas exchange channels and having an internal boundary provided with two zones approaching the axis, output shaft means, triangularly-shaped piston means, means eccentrically supporting said piston means on said output shaft means, and transmission means for imparting to said piston means a movement relative to said housing and to said output shaft means in such a manner that the corners of said piston means slide along the internal boundary and thereby valve the gas exchange channels in said housing means, said transmission means including internally toothed gear means rigidly and concentrically arranged at said piston means, externally toothed gear means meshing with said internally toothed gear means, and means for imparting to said externally toothed gear means a to and fro swinging movement about the axis thereof.

2. A rotary piston internal combustion engine, comprising housing means provided with gas exchange channels and having an internal boundary provided with two zones approaching the axis, output shaft means, triangularly-shaped piston means, means eccentrically supporting said piston means on said output shaft means, and transmission means for imparting to said piston means a movement relative to said housing and to said output shaft means in such a manner that the corners of said piston means slide along the internal boundary and thereby valve the gas exchange channels in said housing means, said transmission means including internally toothed gear means rigidly and concentrically arranged at said piston means, externally toothed gear means meshing with said internally toothed gear means, and means for imparting to said externally toothed gear means a to and fro swinging movement about the axis thereof, including further eccentric means disposed oppositely to said first-mentioned eccentric means for supporting said externally toothed gear means on said output shaft means.

3. A rotary piston internal combustion engine, comprising housing means provided with gas exchange channels and having an internal boundary provided with two zones approaching the axis, output shaft means, triangularly-shaped piston means, means eccentrically supporting said piston means on said output shaft means, and transmission means for imparting to said piston means a movement relative to said housing and to said output shaft means in such a manner that the corners of said piston means slide along the internal boundary and thereby valve the gas exchange channels in said housing means, said transmission means including internally toothed gear means rigidly and concentrically arranged at said piston means, externally toothed gear means meshing with said internally toothed gear means, and means for imparting to said externally toothed gear means a to and fro swinging movement about the axis thereof including further eccentric means disposed oppositely to said first-mentioned eccentric means for supporting said externally toothed gear means on said output shaft means, lever means operatively connected with said externally toothed gear means, and support means for movably supporting the free end of said lever means at said housing means.

4. A rotary piston internal combustion engine, comprising housing means provided with gas exchange channels and having an internal boundary provided with two zones approaching the axis, output shaft means, triangularly-shaped piston means, means eccentrically supporting said piston means on said output shaft means, and transmission means for imparting to said piston means a movement relative to said housing and to said output shaft means in such a manner that the corners of said piston means slide along the internal boundary and thereby valve the gas exchange channels in said housing means, said transmission means including internally toothed gear means rigidly and concentrically arranged at said piston means, externally toothed gear means meshing with said internally toothed gear means, and means for imparting to said externally toothed gear means a to and fro swinging movement about the axis thereof including further eccentric means disposed oppositely to said first-mentioned eccentric means for supporting said externally toothed gear means on said output shaft means, lever means operatively connected with said externally toothed gear means, and support means for movably supporting the free end of said lever means at said housing means, said support means including a sliding member provided at the free end of said lever means and rectilinear guide means fixed at said housing means and disposed substantially radially to said output shaft means for guiding said sliding member.

5. A rotary piston internal combustion engine, comprising housing means provided with gas exchange channels and having an internal boundary provided with two zones approaching the axis, output shaft means, triangularly-shaped piston means, means eccentrically supporting said piston means on said output shaft means, and transmission means for imparting to said piston means a movement relative to said housing and to said output shaft means in such a manner that the corners of said piston means slide along the internal boundary and thereby valve the gas exchange channels in said housing means, said transmission means including internally toothed gear means rigidly and concentrically arranged at said piston means, externally toothed gear means meshing with said internally toothed gear means, and means for imparting to said externally toothed gear means a to and fro swinging movement about the axis thereof including further eccentric means disposed oppositely to said first-mentioned eccentric means for supporting said externally toothed gear means on said output shaft means, lever means operatively connected with said externally toothed gear means, and support means for movably supporting the free end of said lever means at said housing means, said support means including link means pivotally secured to the free end of said lever means, and means for swingingly supporting said link means at said housing means substantially perpendicularly to the longitudinal axis of said lever means.

6. A rotary piston internal combustion engine comprising housing means having an internal boundary provided with two zones approaching the axis, output shaft means, triangularly-shaped piston means, means eccentrically supporting said piston means on said output shaft means, and means for imparting to said piston means a movement relative to said housing and to said output shaft means in such a manner that the corners of said piston means slide along the internal boundary and thereby valve the gas exchange channels in said housing means, said transmission means including internally toothed gear means rigidly and concentrically arranged at said piston means, externally toothed gear means supported concentrically to said output shaft means and meshing with said internally toothed gear means, and means including crank drive means for imparting to said externally toothed gear means a to and fro swinging movement about the axis thereof.

7. In a rotary piston internal combustion engine in which a polygonally-shaped piston is eccentrically supported on the output shaft within a housing having an internal boundary provided with two zones approaching the axis, and in which the piston slides with the corners thereof along the internal boundary during movement thereof relative to the housing and controlled by a transmission having an internally toothed gear concentric and rigid with the piston and an externally toothed gear meshing with the internally toothed gear, and in which the piston during such movement valves the gas exchange channels provided within the housing, the improvement essentially consisting of means for imparting to said externally toothed gear a to and fro swinging movement about the axis thereof to thereby enable attainment of favorable compression conditions with combustion space means arranged within the piston for diesel operation.

8. A rotary piston internal combustion engine comprising housing means having an internal boundary provided with two zones approaching the axis, output shaft means, triangularly-shaped piston means, means eccentrically supporting said piston means on said output shaft means, and means for imparting to said piston means a movement relative to said housing and to said output shaft means in such a manner that the corners of said piston means slide along the internal boundary and thereby valve the gas exchange channels in said housing means, said transmission means including internally toothed gear means rigidly and concentrically arranged at said piston means, externally toothed gear means supported in said housing means and meshing with said internally toothed gear means, and means including crank drive means for imparting to said externally toothed gear means a to and fro swinging movement about the axis thereof.

9. In a rotary piston internal combustion engine in which a polygonally-shaped piston is eccentrically supported on the output shaft within a housing having an internal boundary provided with two zones approaching the axis, and in which the piston slides with the corners thereof along the internal boundary during movement thereof relative to the housing and controlled by a transmission having an internally toothed gear concentric and rigid with the piston and an externally toothed gear meshing with the internally toothed gear, and in which the piston during such movement valves the gas exchange channels provided within the housing, the improvement essentially consisting of means for imparting to said externally toothed gear a to and fro swinging movement about the axis thereof to thereby enable attainment of favorable compression conditions with combustion space means arranged within the piston for diesel operation, said last-mentioned means including eccentric means for supporting said externally toothed gear on said output shaft, said eccentric means being directed substantially in the opposite direction of the eccentric forming the support means for the piston on the output shaft.

10. A rotary piston internal combustion engine comprising housing means having an internal boundary provided with two zones approaching the axis, output shaft means, triangularly-shaped piston means, means eccentrically supporting said piston means on said output shaft means, and means for imparting to said piston means a movement relative to said housing and to said output shaft means in such a manner that the corners of said piston means slide along the internal boundary and thereby valve the gas exchange channels in said housing means, said transmission means including internally toothed gear means rigidly and concentrically arranged at said piston means, externally toothed gear means supported in said housing means concentrically to said output shaft means and meshing with said internally toothed gear means, and means including crank drive means for imparting to said externally toothed gear means a to and fro swinging movement about the axis thereof.

11. In a rotary piston internal combustion engine in which a polygonally-shaped piston is eccentrically supported on the output shaft within a housing having an internal boundary provided with two zones approaching the axis, and in which the piston slides with the corners thereof along the internal boundary during movement thereof relative to the housing and controlled by a transmission having an internally toothed gear concentric and rigid with the piston and an externally toothed gear meshing with the internally toothed gear, and in which the piston during such movement valves the gas exchange channels provided within the housing, the improvement essentially consisting of means for imparting to said externally toothed gear a to and fro swinging movement about the axis thereof to thereby enable attainment of favorable compression conditions with combustion space means arranged within the piston for diesel operation, said last-mentioned means including eccentric means for supporting said externally toothed gear on said output shaft, said eccentric means being directed substantially in the opposite direction of the eccentric forming the support means for the piston on the output shaft, lever means rigidly secured to said externally toothed gear to rotate in unison therewith, and means for movably supporting the free end of said lever means at said housing including a sliding member and a rectilinear guide means for said sliding member fixed at said housing and extending substantially radially to the output shaft.

12. A rotary piston internal combustion engine comprising housing means having an internal boundary provided with two zones approaching the axis, output shaft means, triangularly-shaped piston means, means eccentrically supporting said piston means on said output shaft means, and means for imparting to said piston means a movement relative to said housing and to said output shaft means in such a manner that the corners of said piston means slide along the internal boundary and thereby valve the gas exchange channels in said housing means, said transmission means including internally toothed gear means rigidly and concentrically arranged at said piston means, externally toothed gear means supported on said output shaft means concentrically to said output shaft means and meshing with said internally toothed gear means, and means including crank drive means for imparting to said externally toothed gear means a to and fro swinging movement about the axis thereof.

13. In a rotary piston internal combustion engine in which a polygonally-shaped piston is eccentrically supported on the output shaft within a housing having an internal boundary provided with two zones approaching the axis, and in which the piston slides with the corners thereof along the internal boundary during movement thereof relative to the housing and controlled by a transmission having an internally toothed gear concentric and rigid with the piston and an externally toothed gear meshing with the internally toothed gear, and in which the piston during such movement valves the gas exchange channels provided within the housing, the improvement essentially consisting of means for imparting to said externally toothed gear a to and fro swinging movement about the axis thereof to thereby enable attainment of favorable compression conditions with combustion space means arranged within the piston for diesel operation, said last-mentioned means including lever means rigidly secured to said externally-toothed gear to rotate in unison therewith, and means for movably supporting the free end of said lever means at said housing.

14. In a rotary piston internal combustion engine in which a polygonally-shaped piston is eccentrically supported on the output shaft within a housing having an internal boundary provided with two zones approaching the axis, and in which the piston slides with the corners thereof along the internal boundary during movement thereof relative to the housing and controlled by a transmission having an internally toothed gear concentric and rigid with the piston and an externally toothed gear meshing with the internally toothed gear, and in which the piston during such movement valves the gas exchange channels provided within the housing, the improvement essentially consisting of means for imparting to said externally toothed gear a to and fro swinging movement about the axis thereof to thereby enable attainment of favorable compression conditions with combustion space means arranged within the piston for diesel operation, said last-mentioned means including lever means rigidly secured to said externally-toothed gear to rotate in unison therewith, and means for movably supporting the free end of said lever means at said housing including a sliding member and a rectilinear guide means for said sliding member fixed at said housing and extending substantially radially to the output shaft.

15. In a rotary piston internal combustion engine in which a polygonally-shaped piston is eccentrically supported on the output shaft within a housing having an internal boundary provided with two zones approaching the axis, and in which the piston slides with the corners thereof along the internal boundary during movement thereof relative to the housing and controlled by a transmission having an internally toothed gear concentric and rigid with the piston and an externally toothed gear meshing with the internally toothed gear, and in which the piston during such movement valves the gas exchange channels provided within the housing, the improvement essentially consisting of means for imparting to said externally toothed gear a to and fro swinging movement about the axis thereof to thereby enable attainment of favorable compression conditions with combustion space means arranged within the piston for diesel operation, said last-mentioned means including lever means rigidly secured to said externally-toothed gear to rotate in unison therewith, and means for movably supporting the free end of said lever means at said housing including crank drive means swingingly supported near one end thereof at the housing and near the other end thereof to said lever means.

16. A rotary piston internal combustion engine, comprising housing means provided with gas exchange channels and having an internal boundary provided with two zones approaching the axis, output shaft means, triangularly-shaped piston means, means eccentrically supporting said piston means on said output shaft means, and transmission means for imparting to said piston means a movement relative to said housing and to said output shaft means in such a manner that the corners of said piston means slide along the internal boundary and thereby valve the gas exchange channels in said housing means, said transmission means including internally toothed gear means rigidly and concentrically arranged at said piston means, externally toothed gear means meshing with said internally toothed gear means, and means for imparting to said externally toothed gear means a to and fro swinging movement about the axis thereof including lever means operatively connected with said externally toothed gear means, and support means for movably supporting the free end of said lever means at said housing means, said support means including a sliding member provided at the free end of said lever means, and rectilinear guide means fixed at said housing means and disposed substantially radially to said output shaft means for guiding said sliding member.

17. A rotary piston internal combustion engine, comprising housing means provided with gas exchange channels and having an internal boundary provided with two zones approaching the axis, output shaft means, triangularly-shaped piston means, means eccentrically supporting said piston means on said output shaft means, and transmission means for imparting to said piston means a movement relative to said housing and to said output shaft means in such a manner that the corners of said piston means slide along the internal boundary and thereby valve the gas exchange channels in said housing means, said transmission means including internally toothed gear means rigidly and concentrically arranged at said piston means, externally toothed gear means meshing with said internally toothed gear means, and means for imparting to said externally toothed gear means a to and fro swinging movement about the axis thereof including lever means operatively connected with said externally toothed gear means, and support means for movably supporting the free end of said lever means at said housing means, said support means including link means pivotally secured to the free end of said lever means, and means for swingingly supporting said link means at said housing means substantially perpendicularly to the longitudinal axis of said lever means.

18. In a rotary piston internal combustion engine in which a polygonally-shaped piston is eccentrically supported on an eccentric of the output shaft within a housing having an internal boundary provided with two zones approaching the axis, and in which the piston slides with the corners thereof along the internal boundary during movement thereof relative to the housing and controlled by a transmission, and in which the piston during such movement valves the gas exchange channels provided within the housing, the improvement essentially consisting of means in said transmission for imparting to said externally toothed gear a movement about the axis thereof substantially following the law of $$\omega_k = \frac{\omega_e}{3} + \gamma_0 \cdot \omega_e \cdot f(\alpha_e)$$

to thereby enable attainment of favorable compression conditions with combustion space means arranged within the piston for diesel operation wherein:
  $\omega_k$=angular velocity of piston on the eccentric,
  $\omega_e$=angular velocity of eccentric,
  $\gamma_0$=constant angle,
  $\alpha_e$=angle of rotation of eccentric, and
  $f(\alpha_e)=2\pi$-periodic function.

No references cited.